May 8, 1928.
F. O. HAZEN
AUTOMOBILE POWER UNIT
Filed June 30, 1927
1,669,299
2 Sheets-Sheet 1
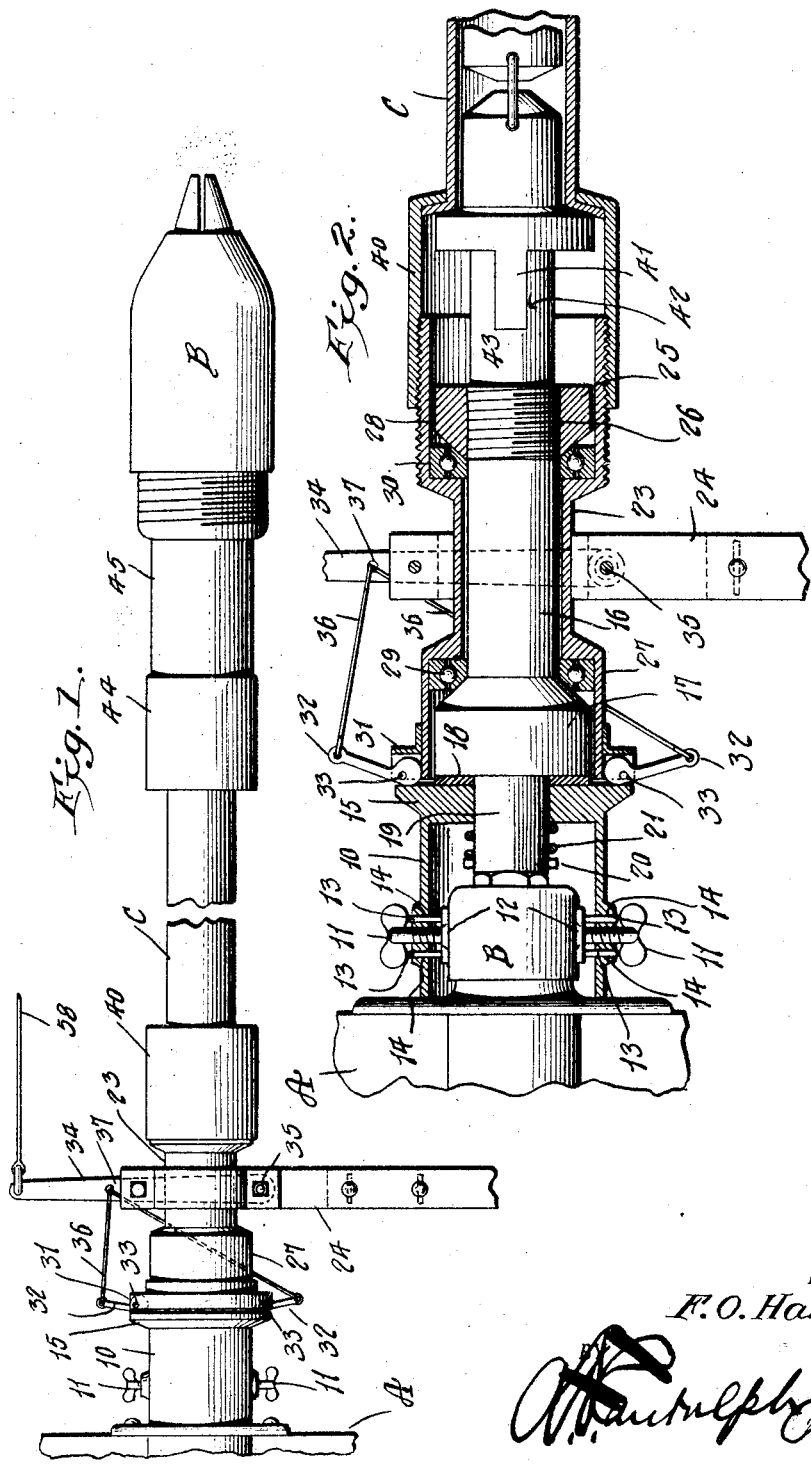
INVENTOR.
F. O. Hazen,
ATTORNEY.

May 8, 1928.　　　　　F. O. HAZEN　　　　　1,669,299
AUTOMOBILE POWER UNIT
Filed June 30, 1927　　　2 Sheets-Sheet 2
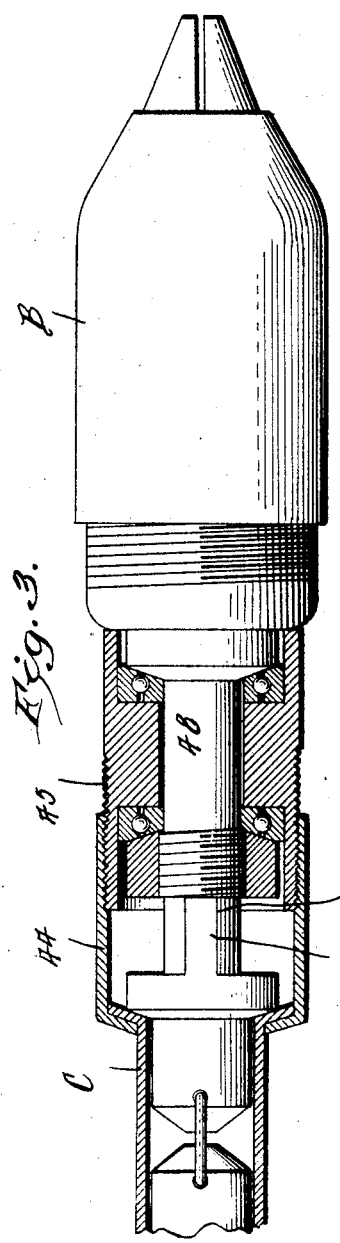
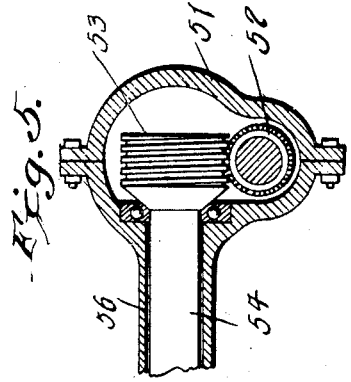
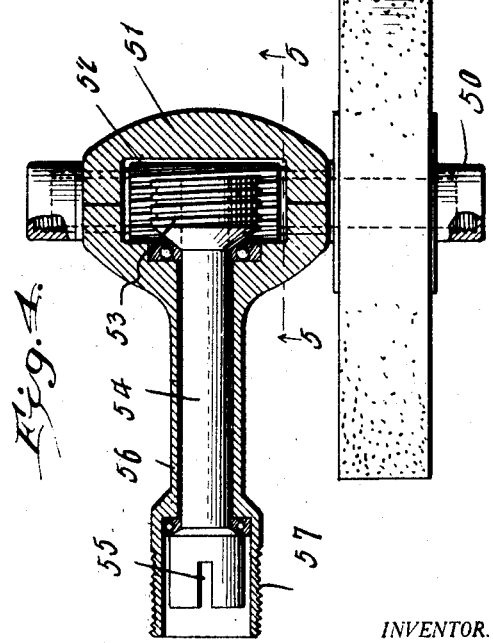
INVENTOR.
F. O. Hazen, Patented May 8, 1928.

1,669,299

UNITED STATES PATENT OFFICE.

FLOYD O. HAZEN, OF OPPORTUNITY, NEBRASKA.

AUTOMOBILE POWER UNIT.

Application filed June 30, 1927. Serial No. 202,587.

This invention relates to a power unit adapted to be driven from a positively driven wheel of an automobile when the latter is appropriately jacked and is primarily adapted for use on the farm where electricity and modern machinery are not available.

It is aimed to provide a novel attachment which may be readily applied to or removed from the hub of a positively driven vehicle wheel, and which unit is of such nature as to be used for various purposes such as operating a drill, an emery wheel, a horse clipping machine, sheep shearing machine and for many other mechanisms and purposes.

One important object is to provide a novel means whereby the drive shaft may be clutched for the application of power and whereby such shaft is journaled in an outer sleeve or the like operable to declutch the drive shaft.

Various additional objects and advantages will partly be pointed out and otherwise become apparent from a consideration of the description following taken in connection with the accompanying drawings illustrating an operative embodiment.

In said drawings:—

Figure 1 is a view in elevation illustrating my improvements adapted for operating a drill;

Figure 2 is a view of the power portion of the device of Figure 1 taken principally in central longitudinal section;

Figure 3 is an enlarged detail of the chuck of Figure 1, in side elevation, and in section with respect to its connection with the flexible shafting;

Figure 4 is a plan view partly in section, illustrating a grinding wheel device which may be operated by my improvements, and Figure 5 is a sectional view taken on the line 5—5 of Figure 4.

Referring specifically to Figures 1 and 2, A designates a positively driven wheel of an automobile, usually one of the rear wheels, and B is the hub extending therefrom. When an automobile equipped with a pair of wheels such as A is operated with such one of said wheels jacked up or elevated, the elevated wheel A serves as a source of power to operate the improved unit constituting this invention. The other wheel is fixedly secured in any suitable manner to prevent rotation, to insure rotation of the elevated wheel this being necessary because of the differential gearing connecting the drive shafts of the wheels.

In carrying out the invention, a cap generally designated 10 is detachably secured in any suitable manner rigidly to the wheel A and preferably to the hub B over which it telescopes. To this end, binding screws 11 may be threaded in the cap 10 and be adapted to bear against plates 12 engaging said hub and guided in their movement by rods 13 extending slidably through openings 14 in the hub. The requisite pressure for holding the cap rigidly on the hub B may be applied to the screws 11. The outer wall 15 of the cap is relatively fixed and in effect forms one face of a clutch.

A drive shaft is shown at 16 having an enlargement at 17 which constitutes the other member of the clutch and which may have fastenings against the face thereof, friction elements such as a washer of rubber as at 18 and adapted for direct contact with the member 15. Drive shaft 16 has a reduced extension 19 journaled in the member 15 and extending inwardly beyond the same and having a pin 20 removably extending diametrically therethrough and positioning an expansive coil spring 21 thereon, in contact with the pin 20 and with the member 15, whereby the clutches 17 and 15 are urged into and adapted to be held in such engagement as to drive the shaft 17 from the wheel and cap, to thus operate any mechanism connected with the drive shaft 16.

Surrounding the shaft 16 and constituting a bearing therefor and fixed against rotation, is a sleeve 23. Such sleeve may be engaged by an auxiliary support or stabilizer 24 of any suitable construction and engaging any suitable part to serve in rigidifying the mounting for the drive shaft. A fastening nut 25 is screw threaded at 26 on the drive shaft and corresponds in shape to the enlargement 17. The sleeve 23 is appropriately enlarged as at 27 and 28, in accordance with the enlargements 17 and 26 and the same amount suitable ball bearings or anti-friction devices 29 and 30, to enable the drive shaft to operate with minimum friction.

The enlargement 27 has brackets 31 thereon accommodating cams 32 which are pivoted thereto at 33. Said cams are adapted for operation to engage the clutch member 15 and slide the sleeve 23 and drive shaft 16 away from the same slightly as a unit, to separate the clutch members 15 and 17 so that motion of the drive shaft 16 is stopped or the same is idle. It is to be understood that the mounting of the sleeve 23 is such as to permit the said slight longitudinal movement of the drive shaft and sleeve. The bearing face of clutch member 15 is smooth so that there is a slip connection with the cams 32 when actuated to disconnect clutch members 15 and 17.

Any suitable means may be provided for actuating the cams 32. For instance a lever 34 may be pivoted at 35 to the support 24 and have rods 36 flexibly connected in an opening 37 thereof and in turn connected to the cams. The movement of the lever 34 in one direction will cause the cams to so act on the member 15 as to declutch the drive shaft and movement in the opposite direction will overcome such engagement to the end that the spring 21 may clutch the drive shaft and member 15.

As hinted, the drive shaft 16 may be applied to any suitable work. In Figures 1 to 3 it is adapted to operate a drill held by a conventional chuck generally designated B. Between such chuck and the drive shaft 16, flexible shafting C of any conventional form may be used. Such shafting however preferably includes an attaching cap as at 40 screw threaded onto the enlargement 28 and maintaining a tenon 41 of the flexible shafting C in engagement with a slot 42 of an extension 43 of the drive shaft. Such flexible shafting also includes a cap as at 44 detachably threaded to a shank 45 of the chuck B so as to maintain a tenon 46 of the flexible shafting C in a slot 47 of the drive spindle 48 of said chuck.

In lieu of the operation of a chuck and the coacting drill or bit, any other tool may be arranged for attachment and operation to and by the device. For instance an emery wheel or other grinding wheel at D may be driven by the attachment. Such wheel D is rigid on a short shaft 50 which is journaled in one end of a bracket 51 and has a worm wheel 52 provided thereon. In mesh with the worm wheel 52 is a worm 53 carried by a shaft 54 provided with a slot 55 and which shaft is journaled in a tubular extension 56 of the bracket 51, which extension is enlarged and provided with screw threads at 57. When the device of Figures 4 and 5 is used instead of the chuck B, the latter is removed by disengaging the elements 44 and shank 45. In place thereof, element 44 engages the screw threads at 57 and the tenon 46 enters the slot 55, thus operatively connecting the grinding wheel attachment.

The lever 34 may be operated if desired from a distance, as through the medium of a pull wire 58.

Various changes may be resorted to provided they fall within the spirit and scope of the invention.

I claim as my invention:

1. A device of the class described comprising a clutch element adapted for connection to a rotatable part, a drive shaft having a clutch member, a spring urging clutch engagement of said parts, a bearing member carrying said drive shaft, and means to move the bearing member and drive shaft as a unit to declutch the latter comprising an operating member, cams under control of said member and engageable with the first mentioned part.

2. A device of the class described comprising a clutch element adapted for connection to a rotatable part, a drive shaft having a clutch member, a spring urging clutch engagement of said parts, a bearing member carrying said drive shaft, and means to move the bearing member and drive shaft as a unit to declutch the latter, and said shaft having bearing contact with the cap.

3. An attachment of the class described comprising a clutch member attachable to a rotatable part, a drive shaft having an extension slidably mounted in said clutch member, a spring engaging said clutch member and said shaft normally maintaining the shaft and clutch member in contact so as to drive the shaft.

4. An attachment of the class described comprising a clutch member attachable to a rotatable part, a drive shaft having an extension slidably mounted in said clutch member, a spring engaging said clutch member and said shaft normally maintaining the shaft and clutch member in contact so as to drive the shaft, and means operable to declutch the shaft and clutch member against the tension of the spring.

5. An attachment of the class described comprising a clutch member attachable to a rotatable part, a drive shaft having an extension slidably mounted in said clutch member, a spring engaging said clutch member and said shaft normally maintaining the shaft and clutch member in contact so as to drive the shaft, a bearing member in which the shaft is journaled, said bearing member being mounted for movement away from the clutch member, and means carried by the bearing and engageable with the clutch member to move the shaft and bearing as a unit and declutch the former.

In testimony whereof I affix my signature.

FLOYD O. HAZEN.